Oct. 14, 1969     J. H. JOHNSON ET AL     3,473,096

PARTICLE SENSING MEANS AND METHOD OF MAKING SAME

Filed Feb. 3, 1967

JIM H. JOHNSON
WALTER J. RAINWATER
JOHN E. STANDEFER
INVENTORS

BY *J. H. Caldwell*

AGENT

United States Patent Office 3,473,096
Patented Oct. 14, 1969

3,473,096
PARTICLE SENSING MEANS AND METHOD OF MAKING SAME
Jim H. Johnson, Arlington, and Walter J. Rainwater and John E. Standefer, Fort Worth, Tex., assignors to Ling-Temco-Vought, Inc., Dallas, Tex., a corporation of Delaware
Filed Feb. 3, 1967, Ser. No. 613,853
Int. Cl. H01g 3/06; G01p 3/54
U.S. Cl. 317—246                             16 Claims

ABSTRACT OF THE DISCLOSURE

A thin-film capacitor for the detection of its penetration by fast-moving particles employs a dielectric formed of two mutually joined, thin, plastic, films, two layers of a conductive material deposited on opposite sides of the dielectric, supporting frames, and means for making electrical connection with the conductive layers. A method is disclosed for making the capacitor wherein the two plastic films are attached to two supporting frames and subsequently brought into mutual contact.

---

This invention relates to the detection of small, fast-moving particles, and more particularly to a capacitor-type hypervelocity sensor and a method of making the same.

The determination of the effect of micrometeoroids upon objects in an environment beyond the atmosphere of the earth has become increasingly important in space technology and a number of designs for particle sensor devices have been considered. Of particular difficulty is the measurement of the velocities of micrometeroid particles impinging on vehicles in outer space. Techniques have previously been developed for this purpose which use a capacitor-discharge type sensor which indicates the impingement of a hypervelocity particle (a particle having velocity greater than approximately 6,000 ft./sec.) by producing a pulse in the voltage across a parallel-plate capacitor upon penetration by the particle. The discharge of the capacitor is accomplished, regardless of the electrical properties of the particle, by shorting the charged capacitor through an ionic plasma path created by the impact, at hypervelocities, of the particle with the capacitor material. By the use of two such sensors spaced a known distance apart, it has been sought to determine the velocity of the particle relative to the sensors by comparing the distance between the sensors with the time lapse between voltage pulses produced by a particle passing through both sensors.

A number of problems occur, however, in the construction and utilization of capacitors for this purpose. Conventional, parallel-plate capacitors are too thick for accurate velocity measurements, for the velocity of the particle is significantly reduced, or the particle is deflected on impact. When thinner devices were developed, they were not self-supporting over sufficiently large areas and hence required the support of wire grids mounted between the conductive plates. A vacuum between the conductive plates was used as a dielectric. The supporting wire grids caused new difficulties, however, in that they necessitated a large separation (in the order of one millimeter) between the conductive surfaces to prevent shorting through the grids. This large separation provided undesirably low capacitances which produced signals of such low intensity that they could not be accurately recorded and were difficult or impossible to resolve from electrical noise. In addition, the grids themselves acted to deflected imping particles, and there was an undesirably small probability that a particle would penetrate both capacitors without striking one of the grids. The conductive films employed in these constructions also introduce serious problems in that those which are thin enough for the purpose are so excessively fragile and difficult to handle without damage that, to cite one example, they are subject to rupture by the mere wind occasioned by the normal-rate opening of a door of the room in which they are housed; such a film can be thoroughly disintegrated by force of the breath of a nearby person.

A more promising construction involves the plating of a thin, conductive material directly onto the two surfaces of very thin films of dielectric materials, such as synthetic plastics, thus eliminating the supporting grid. Unfortunately, however, films of the extreme thinnesses desired are extremely fragile, so that the most careful handling techniques are required. At these thicknesses, gaps and holes often occur in the films, so that any plating of conductive material on the two opposite sides will tend to cause shorts through the gaps. Further, the construction of such very thin films has required very expensive and difficult methods, such as completing the polymerization of the synthetic plastic material while the material is supported on a glass substrate, and then painstakingly separating the film from the substrate. Difficulties in handling the films arise since they tend to tear or rupture under the imposition of even an extremely small distorting force, and it is difficult to secure the film to supports with adhesives, etc. Conductive paint such as employed in printed circuits may not be applied to the film for providing electrical contacts, for the solvents used in the paint would tend to damage the film material. The ideal sensor should be readily punctured by microparticles, yet should be self-supporting over large areas and resistant to shock or vibration occuring in space vehicles.

It is, accordingly, a major object of the present invention to provide a new and improved apparatus for sensing the impingement of minute particles.

A further object of the present invention is to provide a capacitor-type particle sensor device which is readily punctured by an impinging microparticle, yet durable under handling and resistant to shock and vibration.

A related object is to provide a capacitor-type particle sensor device which will allow the penetration of two such sensor devices in series by a microparticle without retarding the particle to an undesirable degree, thus allowing accurate particle velocity measurements.

Another object is to prevent shorting of the conductive layers of a thin film capacitor through any holes which might occur in the dielectric film material.

Still another object is to provide a thin-film capacitor which is self-supporting over large areas, thereby eliminating the need for supporting members which tend to deflect or retard particles which penetrate the device.

An additional object is to provide a capacitor-type sensor with a very thin dielectric which provides a large capacitance, whereby voltage pulses produced by particles which puncture the sensor are of such high intensity that they are easily recorded and readily distinguished from any electrical background noise.

Yet another object is to provide a capacitor-type particle sensor providing the above-stated advantages which nonetheless can be easily and inexpensively constructed.

A still further object is to provide a parallel-plate capacitor of thinner construction than has previously been possible.

A major object is to provide a new and improved method of constructing a capacitor-type particle sensor device.

A related object is to provide a method of constructing a capacitor-type particle sensor device having thin dielectric films and supporting frames, which method eliminates the necessity of bonding the film to a frame.

Another object is to provide a method of constructing a thin-film capacitor-type particle sensor device, which method eliminates expensive or difficult procedures such as the forming of the film on the surface of a solid substrate.

Still another object is to provide an improved method of applying an electrically conducting means to very thin layers of conductive material.

Other objects and advantages will be evident from the specification and claims and the accompanying drawing illustrative of the invention.

Figure 1:
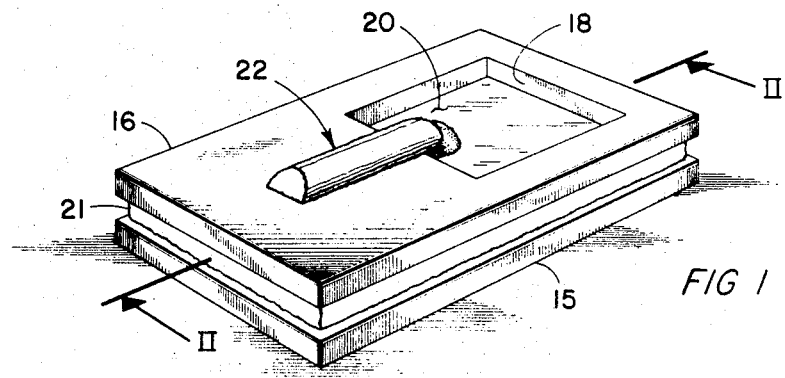
FIGURE 1 is a perspective view of an embodiment of the invention.

With reference to FIG. 1, the capacitor-type high-velocity particle sensor comprises first and second frames 15, 16, each of which is preferably made in the form of a relatively thin, flat plate having an opening therethrough such as shown at 18. In a preferred embodiment, the frames 15, 16 are of matching size and shape and are positioned in a relationship to each other in which their matching edges are mutually in register, the frames being rigidly fixed in this relatonship by means such as a hard-setting adhesive material 21 extending between them at their edges. A preferred material for the frames 15, 16 is a glass fiber reinforced epoxy resin, although other materials are entirely suitable.

Figures 2, 3:
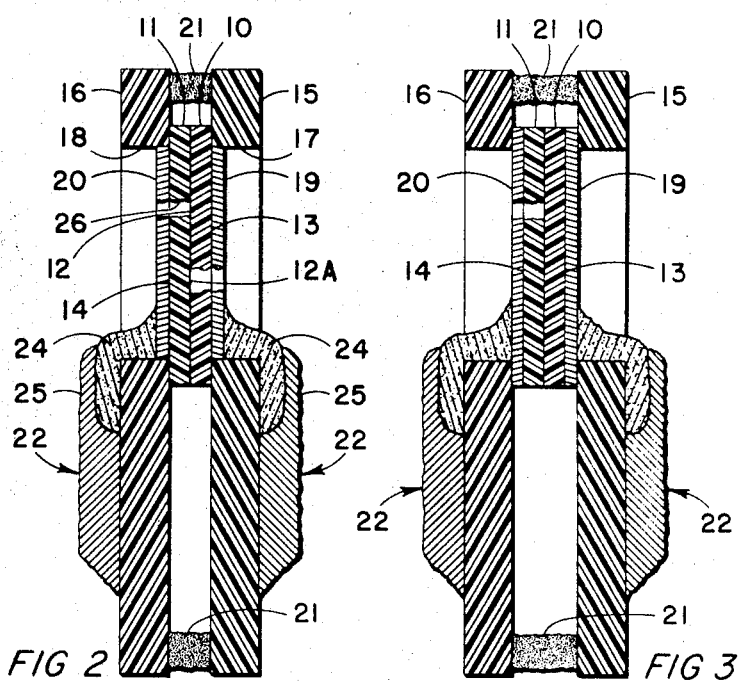
FIGURE 2 is a longitudinal, sectional view taken in the plane designated by the line II—II in FIG. 1.
FIGURE 3 is a view similar to FIG. 2 and showing a modification of the embodiment shown in FIG. 1.

Referring now to FIG. 2, the frame openings 17, 18 are approximately in register with each other. The opening of the first frame 17 is covered by a first thin, dielectric film 10 mounted on the face of the first frame which is most closely adjacent the second frame. A second thin, dielectric film 11 is similarly mounted on the second frame 16. For important reasons to be explained, the combined thickness of the films 10, 11 is less than 50,000 angstroms; typically, each film is of the order of a few hundred angstroms in thickness. For example, films of approximately 500 angstroms in thickness have been successfully employed. Each film 10, 11 has an outer face 13 or 14 which is rigidly mounted on the associated frame 15 or 16 by its self-adherence thereto, a property characteristic of films of the range of thickness mentioned and yielding, as will be seen, important advantages. The spacing between the frames 15, 16 is generally equal to the combined thicknesses of the films 10, 11 which therefore lie in mutual contact at their first 12, 12a or inner faces and thereby are superimposed to form successive layers. Again because of their thinness, the films 10, 11 are inherently adherent to each other.

The frames 15, 16, when their respective films 10, 11 are adhered thereon, are in intimate contact with and hence mask off portions of the film second 13, 14 or outer faces, which film face portions are bare and lie in direct contact with the respective frames. The first frame 15 thus leaves exposed an area of the first film outer face 13 which is bordered by the frame opening 17; and on at least most of this exposed area there is placed a first thin layer of an electrically conductive material 19. The corresponding outer face 14 of the second film 11 is similarly provided with a second, thin conductive layer 20; and the two conductive layers 19, 20 are mutually spaced by the combined thicknesses of the films 10, 11. In a preferred embodiment, coatings of gold of approximately 100 angstroms thickness are used as the layers of conductive material 19, 20.

Means 22 for making electrical contact with the layers of electrically conductive material 19, 20 are provided, typically as a strip of conductive material extending from a point on the layer of electrically conducting material 19 to a point on the corresponding frame 16, at which point the frame is electrically non-conductive.

FIG. 3 shows a modification of the invention in which the frames 15, 16, adhesive 21, films 10, 11, and conductive layers 19, 20 are constructed and related substantially as described above, with the exception that the conductive layers on the respective film outer faces 13, 14 extend onto the portion of those faces lying in contact with and adhered to the respective frames 15, 16. The layers of electrically conductive material 19, 20 are electrically insulated from each other by means including the films 10, 11. Where the frames 15, 16 are made of non-conductive material, they also effect such electrical insulation; where they are not, the adhesive 21 must be non-conducting in order that it will not effect electrical connection between the frames. An insulative adhesive is preferred in any case; and a metallic frame (if such is used) can in effect be rendered non-conductive by providing it with an insulating surface as by anodizing, etc.

With reference to FIG. 2, the method of making the capacitor comprises the step of supporting a first thin, dielectric film 10 of plastic having first 12 and second 13 faces in substantially planar configuration (on the upper surface of a fluid) so that the film is free of contact with solids other than at its edges. The fluid, of course, must be disposed in a container; and contact of the film 10 at its periphery with the container is not deleterious. The fluid should be one which is substantially free of foreign particles, and in which the film 10 is insoluble; distilled water is a suitable fluid. The preferred method of providing a thin film 10 is to place the plastic material of which the film is made on the surface of a fluid while the plastic is dissolved in a volatile organic solvent, such as cyclohexanone, and then evaporate the solvent while stretching the plastic over the surface, thus forming a tough, thin, plastic film 10. Lowering the temperature of the fluid decreases substantially the evaporation rate of the organic solvent and provides a control on this evaporation rate; thus, the homogeneity of the thin film 10 is improved. The film 10 may be formed on the surface of a fluid, without stretching the film while the organic solvent is evaporating, by using a very dilute solution of the plastic spread uniformly over the surface of the fluid.

Other methods of forming thin films have comprised initially supporting the plastic on a solid substrate rather than a fluid. A preferred plastic is polyvinyl chloride polyvinyl acetate, although other soluble resin polymers may be substituted. Examples of other polymers which would be suitable are polyvinyl alcohol, the polyacrylics, the cellulose nitrates and the polystyrenes. A copolymer, such as the polyvinyl chloride polyvinyl acetate mentioned, is generally preferred to a polymer derived from a single monomer because of the desired physical properties such as high tensile strength and tolerance of temperature extremes which are found in some of the copolymers.

A first frame 15 is provided for receiving the film 10, the frame having oppositely disposed faces and an opening 17 therethrough.

The film 10 is then adhered on the frame 15 in a position such that the frame opening 17 is substantially covered by the film, the step of adhering being effected by bringing the frame into contact with the film and allowing the self-adherent properties of the film to effect an attachment of the film to the frame. A preferred method of bringing the frame 15 into contact with the film 10 is to raise the frame into contact with the film from beneath the surface of the fluid upon which the film is supported and thereupon lifting the frame and attached film from the fluid.

As an alternative procedure, the film 10 is supported at its borders by peripheral members or other structures than the fluid surface described, and the frame 15 is thereupon brought into contact with the film in the relation stated; and any other procedures effecting contact of the frame with the supported film to produce the relationship between them already pointed out is suitable. For reasons that will become apparent, the frame 15 must be the first solid contacted by the film 10 except at its borders.

The above steps are then repeated with a second similar frame 16, and a second thin, dielectric film 11 also having respective first 12a and second faces 14.

The two frames 15, 16, with respective first and second films 10, 11 attached, are then affixed together in a mutual relation wherein the first faces 12, 12a of the films are superimposed in mutual contact with each other and the two frame openings 17, 18, as previously described, are substantially in register. Because of the characteristic adherence of such thin films to any contacting surface, the first and second films 10, 11 thus adhere to each other to form a single dielectric structure lying between the frames 15, 16. The frames 15, 16 are affixed by rigidly connecting them with means such as a hard-setting, electrically insulative adhesive material 21 extending between them at their edges. Otherwise, the affixing may be effected by insulating mechanical fasteners, clamps, etc.

A thin layer of electrically conductive material 19, 20 is then deposited on the second faces 13, 14 of each of the films 10, 11 as by evaporating gold or other selected metal adjacent the films in a vacuum environment. An alternate and preferred method is to deposit the conductive material on the second faces 13, 14 of each of the frame-mounted films 10, 11 before the frames 15, 16 are brought together and then to affix the frames together in a mutual relation in which the respective first faces 12, 12a of the first and second films are in contact with each other. The deposition of metal on each of the films 10, 11 is continued until a metallic layer is produced which is substantially devoid of discontinuities within the coated area but which otherwise is as thin as possible.

Figures 4, 5, 6:
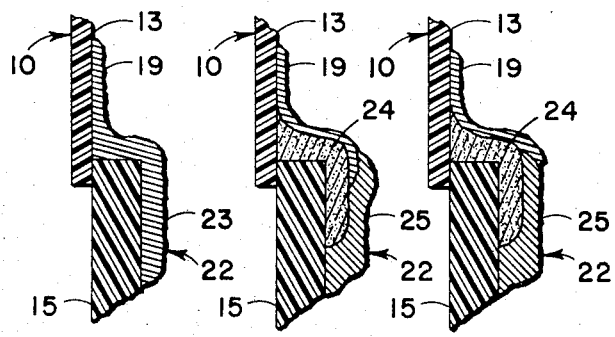
FIGURE 4 is a fragmentary, longitudinal sectional view of the device of FIG. 1 taken in the same plane as FIG. 2 and showing, in enlarged detail, a modification of the means for making electrical contact.
FIGURE 5 is a view similar to FIG. 4 and showing another modification of the means for making electrical contact.
FIGURE 6 is a view similar to FIG. 4 and showing still another modification of the means for making electrical contact.

Means 22 for providing electrical contact with the thin layers of conductive material 19, 20 on the second faces 13, 14 of the first and second films 10, 11 is also provided. With reference to FIG. 4, one method of forming such means 22 is by depositing a thin layer 19 of conductive material on the respective second face 13 of the film 10 as described above, but in such a manner that the layer of conductive material is also deposited over an area of the frame face opposite the film where it is continuous with, and preferably thicker than, the conductive material deposited on the film. This may be accomplished by placing a screen slightly smaller than the frame opening 17 in front of the frame opening and its attached film 10 while the thicker layer 23 is deposited and removing the screen to deposit the thin layer 19 over the remainder of the film face 13. The thicker layer of conductive material 23 on the frame 15 thus provides a convenient surface for providing electrical contact between electrical leads, etc. and the thin layer 19 of electrically conductive material on the dielectric film 10.

As shown in FIG. 5, an alternate and preferred method of providing a means 22 for making electrical contact with the thin layer 19 of conductive material involves forming, subsequent to the step of adhering the film 10 to the frame 15 and prior to the step of depositing the thin layer of conductive material on the film, a first conductive pathway layer 24 extending from the second face of the film 13 to a location on one of the frame faces. The first conductive pathway layer 24 is composed of finely divided, electrically conductive material suspended in a liquid in which the film is insoluble; colloidal graphite suspended in water is an example. The liquid is then evaporated away to leave a strip of conductive material. A second conductive pathway layer 25 is then formed overlying the first 24, and extending from a point thereon spaced from the film, to a location on said one of the frame faces. The second conductive pathway 25 is produced by applying a finely divided, conductive material suspended in a hard-drying liquid vehicle to the first layer 24 and frame 15. The first conductive pathway layer 24 thus provides a continuous, electrically conducting path between the conductive layer 19 and the frame 15, while the second conductive pathway 25 extends over the first conductive pathway 24 and provides a hard surface on the frame 15 which is suitable for making electrical contact. A typical material used for the second conductive pathway 25 is finely divided silver suspended in a carrier in which butyl acetate is employed as a solvent. The paints used in forming printed electrical circuits are typical of such a material.

The above alternate method of forming a means 22 for making electrical contact with the thin layer of conductive material 19 is accomplished by depositing the thin layer of conductive material 19 subsequent to the forming of the first conductive pathway layer 24, but prior to the forming of the second conductive pathway layer 25. Or, as shown in FIG. 6, both the first and second conductive pathway layers 24, 25 are deposited prior to the step of depositing the thin layer of conductive material 19. In either case, the procedure is then repeated with the other frame 16 and its attached film 11 to form the other lead of the capacitor.

The sensor, as described, thus provides a tough but thin and readily punctured capacitor which is well suited for the purpose of detecting impinging microparticles. The first 19 and second 20 conductive layers act as the plates of a parallel-plate capacitor, for they are formed of highly conductive material and are electrically insulated from each other. Since the dielectric films 10, 11 are of a combined thickness of only a few hundred angstroms and of useful area of from one to four square inches, an extremely high capacitance is achieved $$\left(C = \frac{A}{d}\epsilon\right)$$

so that discharge of the sensor will produce a voltage pulse which can be easily and positively detected. The sensors have been demonstrated to sustain a charge in excess of 20 volts, and their discharges thus are readily distinguished from any electrical background noise. The discharge of the sensor by a hypervelocity particle results from the partial ionization of the capacitor material by the passage therethrough of the particle, and the capacitor is discharged along an ionic plasma path created temporarily between the conductive layers 19, 20 by the high-speed impact of the particle upon the capacitor. Therefore, the discharge of the capacitor occurs regardless of the electrical properties of the particle and does not depend upon the electrical conductivity of the particle itself to complete an electrical circuit as it passes between two electrically charged surfaces, as is the case in ballistic target devices.

The construction of the dielectric of mutually attached first 10 and second 11 films is an effective solution to many of the problems arising in the use of very thin films for microparticle detection. Although the technique of forming the film over a fluid surface produces a thin film of high tensile strength, it occurs that such very thin films will often have tiny holes 26 through them which result in the failure of the device since, when the electrically conductive material is deposited on both sides of the dielectric, the conductive layer deposited last will contact the other conductive layer through at least one of the holes, thus shorting the device. By forming the dielectric of two mutually attached films 10, 11 however, any holes which may occur in one film will, in nearly all cases, be covered by unperforated material of the opposite film. It has been found, though not fully explained, that even in cases where, by coincidence, a hole in one film does fall in register with a hole in the other film when the two films are brought together after being separately coated on their non-contacting sides, the conducting layers do not contact each other through the holes in the films. The holes are caused by particles of impurities, such as dust on the fluid surface, which prevent a completely consistent layer of film from forming. Such particles are typically of a diameter of less than 50,000 angstroms; hence, only films of thicknesses greater than approximately 50,000 angstroms may be formed which are generally free of holes. The double-layered construction of the thin dielectric film nonetheless provides a highly effective dielectric of thickness much less than 50,000 angstroms.

The techniques described above provide a dielectric film of such high tensile strength that the sensors are fully self-supporting over areas of from one to four square inches, as mentioned, and thus eliminate the need for supporting members which may effect or retard impinging particles. The sensor is of such thin construction, however, that its mass per square inch is extremely low, approximately 20–200 micrograms/cm.$^2$, so that an impinging microparticle is not significantly retarded or deflected on impact. Therefore, two of the sensors may be disposed in register and spaced apart by a known distance to enable measurement of the velocity of an impinging particle by the time sequence method previously described without significantly distorting the data by retarding or deflecting the particle as it penetrates the first such sensor.

The first 15 and second frames 16 act to support the dielectric films 10, 11 in planar configuration and serve to facilitate the handling and mounting of the sensor. Because of the inherent adherence of the films 10, 11 to the frames 15, 16 and to each other, the need for any type of adhesive between the first 10 and second 11 dielectric films and between the films and the frames is eliminated. Thus a consistent, even adhesion results at all desired areas. The mutually adherent films 10, 11 form an electrically continuous dielectric layer. The two layers 19, 20 of electrically conductive material deposited on the outer faces 13, 14 of the films 10, 11 are electrically efficient as capacitor plates, but do not provide any significant physical support for the device, since they are deposited to a thickness, for example, of approximately 100 angstroms. Because of the difficulty of physically securing an electrical lead to the thin layers 19, 20 of conductive material without damaging the dielectric film 10, 11, means 22 are provided for making electrical contact with the conducting layers by either depositing the conductive layers continuously over a part of the frame as well as the dielectric film or by forming a conductive strip from a point on the film to a point on the frame. Electrical contact is then made with the conductive material on the frame 23, 25 by external means such as spring clips or soldering.

The method of construction of the sensor by attaching the film to the frame while the film is still supported over the fluid eliminates the need of handling the film during its formation and as it is adhered to the frame and thus prevents possible tearing or contamination of the film such procedures. The difficult and often destructive step of removing the film from a solid substrate is also avoided, for the film is kept free of contact with solids other than at its edges because of its tendency to adhere to any such foreign body brought into contact with it. Thus, the method of forming the film on the surface of a fluid and bringing the frame into contact with the film without any intermediate steps eliminates handling difficulties and production expense, and also is of importance in providing the other advantages described above.

The use of a hard-setting, electrically insulative adhesive material 21 for affixing the frames 15, 16 together prevents any shorting between the two conductive layers 19, 20, particularly if a conductive material is used in the frames.

The further step of providing a convenient means 22 for making electrical connection with the two conductive layers 19, 20 provides a continous, electrically conducting strip from the conducting layer to a point on the frame where convenient electrical contact can be made. Conventional electrically conductive paints may not be used because the solvent used in such solutions would tend to attack the dielectric films. Therefore, the first conductive pathway layer 24 is formed of a liquid in which the film is insoluble and provides a base over which the second conductive pathway layer 25 may be formed without attacking the film.

For purposes of clarity, the accompanying drawing is not drawn closely to scale; the thicknesses of the films and conductive surfaces in particular have been greatly exaggerated. While certain modifications and embodiments of the invention have been described and shown in the drawing, it will be evident that various further modifications are possible without departing from the scope of the invention.

We claim:
1. A capacitor-type hypervelocity particle sensor comprising:
   first and second thin, dielectric films through which hypervelocity particles may pass with little resistance and superimposed one on the other to form successive layers, the films having mutually contacting faces and each having an outer face;
   first and second frames positioned in fixed relation to each of said films, electrically conductive material in by a respective one of said films, the frame openings being approximately in register with each other;
   first and second thin, mutually spaced layers of electrically conductive material each coating the outer face of a respective one of the films; and
   means for making electrical contact with said layers of electrically conductive material and comprising, at each of said films, electrically conductive material in electrical contact with the electrically conductive layer thereon and extending therefrom beyond the film and onto the frame.

2. The sensor claimed in claim 1, said films being inherently adherent to the frames and to each other.

3. A capacitor-type hypervelocity particle sensor comprising:
   first and second thin, dielectric films through which hypervelocity particles may pass with little resistance and superimposed one on the other to form successive layers, the films having mutually contacting faces and each having an outer face;
   first and second frames positioned in fixed relation to each other, each frame having an opening covered by a respective one of said films, the frame openings being approximately in register with each other;
   first and second thin, mutually spaced layers of electrically conductive material each coating the outer face of a respective one of the films; and
   means for making electrical contact with said layers of electrically conductive material, each frame having a non-conductive surface portion spaced from the film and the means for making electrical contact comprising a conductive material placed on the non-conductive surface portion and extending into electrical contact with the associated one of the conductive layers.

4. The method of making a capacitor comprising:
   supporting a first thin, dielectric film having first and second faces in a configuration in which said faces are substantially planar;
   providing a first frame defining an opening and having oppositely disposed faces surrounding said opening;
   adhering the film second face on the frame in such position that the frame opening is substantially covered by the film;
   repeating the preceding steps with a second frame and a second thin, dielectric film having first and second faces;

affixing the frames together in a mutual relation wherein the film first faces are superimposed in mutual contact with each other and the frame openings are substantially in register; and depositing a thin layer of a conductive material on the second face of each of the films at a time before affixing the frames in a mutual relation wherein the first and second films are in contact with each other.

5. The method claimed in claim 4, the step of supporting the film being accomplished while the film is free of contact with any solids other than at its edges.

6. The method recited in claim 4, the step of adhering the film on the frame being accomplished by bringing the frame into contact with the film.

7. The method recited in claim 4, the thin film being supported on the upper surface of a fluid substantially free of particles foreign to the fluid forming the surface and in which fluid the film is substantially insoluble.

8. The method set forth in claim 4, the film being adhered to the frame by raising the frame into contact with and film and through the surface of the fluid from beneath the film supported on the upper surface of the fluid.

9. The method set forth in claim 4, the step of affixing the frames together being effected by rigidly connecting the frames with an electrically insulative material.

10. The method of claim 4, further comprising cohering the film first faces together, which cohering is accomplished by the bringing of the first faces together called for in the step of affixing the frames in the relationship stated.

11. The method of claim 4, the step of depositing a thin layer of a conductive material on the second face of each of the films including depositing a thin layer of a conductive material on an area of the frame face opposite the film and continuous with and thicker than the thin layer of conductive material deposited on the film.

12. The method recited in claim 4 and further comprising:

forming, subsequent to the step of adhering the film to the frame and prior to the step of depositing the thin layer of conductive material, a first conductive pathway layer extending from the film second face to a location on one of the frame faces, said first layer being composed of a finely divided conductive material suspended in a liquid in which the film is insoluble;

evaporating away the liquid of the first layer; and forming a second conductive pathway layer overlying the first conductive pathway layer and extending from a point thereon spaced from the film to a location on said one of the frame faces, the second layer being produced by applying to the first layer and frame a conductive, finely divider material suspended in a hard-drying liquid vehicle.

13. The method of claim 12, the step of depositing the thin layer of conductive material being accomplished subsequent to forming both the first and second conductive pathway layers.

14. The method of claim 12, the step of depositing the thin layer of conductive material being accomplished subsequent to forming the first conductive pathway layer and prior to forming the second conductive pathway layer.

15. The method of making a capacitor comprising:

providing a pair of thin dielectric films of combined thickness less than 50,000 angstroms and each having two bare faces;

depositing a thin layer of a conductive material on one bare face of each of the films;

adhering the films together by placing them in superimposed relationship, with the remaining bare face of one of the films in contact with the corresponding face of the other film; and constraining the adhered films to lie in a desired configuration.

16. The sensor set out in claim 1, each frame having a non-conductive surface portion spaced from the film, said conductive material of said means for making electrical contact comprising, at each frame, a portion of the corresponding conductive layer, the portion extending from the film and onto the non-conductive surface portion of the frame.

References Cited

UNITED STATES PATENTS

| | | | |
|---|---|---|---|
| 2,615,994 | 10/1952 | Lindberg | 317—246 X |
| 2,819,085 | 1/1958 | Brown. | |
| 3,012,176 | 12/1961 | Williams | 317—261 X |
| 2,842,726 | 7/1958 | Robinson | 317—260 X |
| 3,215,933 | 11/1965 | Scanlon. | |
| 3,307,407 | 3/1967 | Berg | 317—246 X |

LEWIS H. MYERS, Primary Examiner

ELLIOT GOLDBERG, Assistant Examiner

U.S. Cl. X.R.

29—25.42; 73—398; 200—52, 61.08; 317—261; 324—70